United States Patent [19]

Boster

[11] Patent Number: 4,523,451

[45] Date of Patent: Jun. 18, 1985

[54] HYDRAULIC PROXIMITY PROBE

[75] Inventor: Clark S. Boster, Whittier, Calif.

[73] Assignee: Borg-Warner Corporation, Chicago, Ill.

[21] Appl. No.: 552,882

[22] Filed: Nov. 17, 1983

[51] Int. Cl.$^3$ .............................................. G01B 13/12
[52] U.S. Cl. .................................................. 73/37.6
[58] Field of Search ..................... 73/37.6, 37.8, 37.9

[56] References Cited

U.S. PATENT DOCUMENTS

| 2,665,579 | 1/1954 | Fortier | 73/37.6 |
| 2,684,568 | 7/1954 | Senger . | |
| 3,363,453 | 1/1968 | Erickson | 73/37.6 X |
| 3,754,433 | 8/1973 | Hyer | 73/37.6 |

FOREIGN PATENT DOCUMENTS

| 198697 | 8/1967 | U.S.S.R. | 73/37.6 |

OTHER PUBLICATIONS

Bently Nevada—"Probe and Proximitor", Installation Manual, Section 1, Theory of Operation, (Title Page, Index, pp. 1—1 to 1—13), undated.

*Primary Examiner*—Stewart J. Levy
*Assistant Examiner*—Joseph W. Roskos
*Attorney, Agent, or Firm*—Robert L. Zieg

[57] ABSTRACT

An hydraulic proximity probe arrangement for determining the spacing of the surface of a rotating body from another fixed body as it rotates in a fluid medium. The body is provided with a plurality of circumferentially and equally spaced surface irregularities of like size and shape, such as indentations or projections, and at least a pair of probes are circumferentially spaced around the body, each being axially spaced an equal distance from the body's surfaces when at rest. The probes pick-up pulsations in the fluid medium caused by the rotating body, the amplitudes of which are indicative of the spacing of the surface of the rotating body from the end of the probes. These pulsations are signalized and the resultant signals are compared with calibrated deviation signals to provide data indicative of the spacing of the body's surface from a reference point during rotation of the body.

3 Claims, 1 Drawing Figure

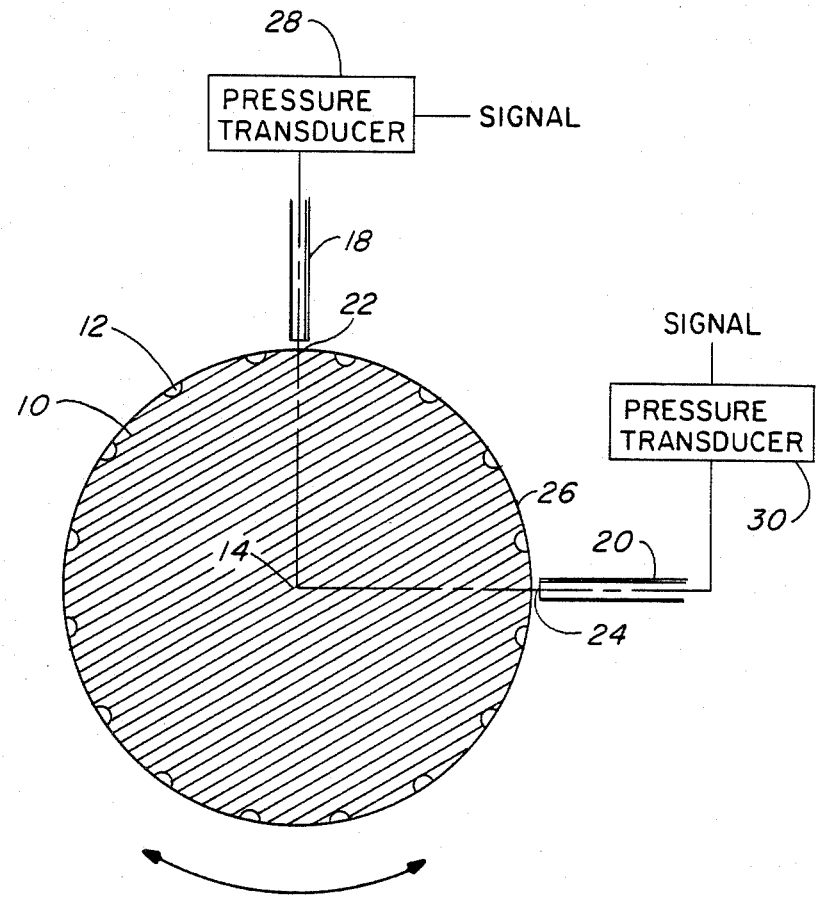

HYDRAULIC PROXIMITY PROBE

BACKGROUND OF THE INVENTION

Rotary or centrifugal pumps, in which one or more rotating impellers, each connected to a shaft, pump a liquid from an intake to a discharge, or volute, require the maintenance of very close clearances between rubbing surfaces for their continued volumetric efficiency. Pumps of this kind are frequently used to pump liquids at relatively high temperatures, and are used in applications where it is not possible or feasible to physically inspect the pumps during operation.

For example, the pump structure of nuclear reactor pumps and down hole pumps, cannot be inspected for operating problems, such as deviations in clearances between relatively rotating parts. The rotating parts can include shafts, impellers, and the like. The deviations in clearances can be caused by unbalanced radial forces due to the lack of circumferential symmetry of the various parts, and/or as a result of the elevated temperatures of the liquid being pumped which can cause thermal expansion of the parts.

PRIOR ART

Hyer, in U.S. Pat. No. 3,754,433, teaches a fluidic proximity sensor particularly adapted to sense the clearance between gas turbine engine compressor blade tips and the adjacent wall of a compressor housing. In one embodiment, there is provided an air flow passage having a chamber with an inlet and a restricted outlet in series flow relationship. The inlet receives compressor pressurized air and is arranged in a predetermined relatively close, spaced-apart, relationship with a compressor blade tip which sweeps the inlet to vary the effective flow area thereof. The resulting pressure pulses are integrated in the chamber and the resulting pressure compared to a regulated reference fluid pressure by means of a pressure differential responsive device, the output of which represents the radial clearance between the compressor blade tips and adjacent housing wall. In another embodiment, a second air flow passage connected in parallel flow with the above-mentioned air flow passage is provided with a pair of series flow restrictions between which a reference pressure is generated. The inlet to the second passage is not affected by the compressor blade tips. The reference pressure is compared to the chamber pressure representing the radial clearance between the compressor blade tips and adjacent wall.

As described, the Hyer embodiments require the use of an external pressure source or sources.

Senger, in U.S. Pat. No. 2,684,568, teaches a method and apparatus to ascertain deformation of the housing and rotor of turbo-machines caused by unequal heat distribution. A current of a gaseous fluid, such as steam or air, is conveyed to a turbo-machine so that deformation of the housing and rotor cause a pressure variation in the gaseous fluid. The pressure variation can be used to indicate the deformation. Apparatus comprising a measuring tube connected in the current of gaseous flow is installed in the housing opposite a revolving surface of the rotor. One end of the measuring tube constituting the mouth, is spaced a small distance from and confronts and revolving surface. The other end of the tube is provided with a throttle orifice whose cross-section is approximately of the same size as the mean cross-section of the gap between the mouth of the measuring tube confronting the rotor, so that the pressure variation caused in the measuring tube by the deformation of the housing and rotor can be used to indicate the deformation. The back pressure between a nozzle plate and the mouth of the tube is indicative of the radial clearance between the rotor and housing. A manometer connected in the tube measures the back pressure and can be calibrated to indicate the radial clearance.

Like Hyer, an external pressure source is required for the Senger method and apparatus.

A Bently Probe manufactured by Bently Nevada Company is a non-contacting, eddy current probe used as a gap-to-voltage tranducer. It is used to measure distance and change in distance to any conductive material, as for example, a rotating machine shaft. The probe is driven by a generated RF voltage and the signal output by the voltage generator is a voltage proportional to the gap distance between the Probe and the observed surface.

The Bently Probe requires a relatively low voltage DC electrical source, and means to convert this voltage into a RF signal which is radiated into the surrounding area as a magnetic field. This field is only affected by conductive material which absorbs the energy. The desired gap between the probe and the rotating part is indicated when the total energy is absorbed by the surface of the conductive material; the gap varies due to the difference in the conductivity of the materials used in constructing the rotating device. In high temperature and pressure environment, electrical inductive proximity probes are prone to malfunction or are very expensive to install and service.

SUMMARY OF THE INVENTION

The invention herein described relates to apparatus for detecting anomalies in the spacing of the surface of a rotating body from a reference surface using internally induced fluid pressure transients, and is especially adaptable for use in apparatus such as pumps, compressors and the like. In these apparatus, it is desirable to ascertain radial clearances between rotating and stationary parts, as for example, between compressor blades or impellers and the respective housings, or between a shaft and a stationary part. The invention finds particular use in those applications where access to the rotating parts is limited or does not exist when the device is in operation.

An important application of this invention is its use with nuclear primary pumps where the operating environment is about 575° F., and up to 2250 psi for water reactors, and about 1000° F. for liquid metal reactors. The invention can be used in connection with the pump's hydrostatic or carbon bearings to provide an advance notice of a potential pump operating problem. The invention can also be used in nuclear safeguard pumps to determine if the pump's relatively rotating wearing surfaces have been damaged during a seismic event.

To detect such anomalies of clearances, at least a pair of hollow, tubular probes are circumferentially positioned approximately 90° from each other around the rotatable body. The terminal end of each probe is spaced a known distance from a surface of the body when at rest. Preferably, the distance from the body's surface is the same for each probe. The rotatable body is provided with a plurality of equally and circumferentially spaced surface irregularities, such as indentations or projections, preferably aligned in the same plane as the probes. Each surface irregularity is identical to the others. When the body rotates in a fluid medium, pressure pulsations are produced and the probes pick-up these pressure pulsations at a frequency determined by the number of surface irregularities on the rotating body and the speed of rotation of the rotating body. The amplitude of the pulsations is the function of the spacing of the surface of the rotating body from the probes. The pressure pulsations are fed by the hollow probes to pressure transducers which translate them into signals. The signals from the pressure tranducers are compared with calibrated deviation signals to provide data indicative of the spacing of the rotating body's surface from the probes. Thus malfunctions of the apparatus can be anticipated due to improper spacing of the relatively rotating parts.

To provide the calibration signals, an experimental mock-up of the rotating device is assembled. The actual cross-sectional measurements and the number and kind of surface irregularities are the same as in the production structure. The rotational speed is reproduced. Probes are located around the device and are mounted so as to be radially movable to or away from the rotating surface. Signals produced by the generated pulsations at known and measured distances from the surface of the rotating device are recorded so that they can be compared with the signals produced when the actual device is operating.

No fluid pressure from an external source impinges on the rotating body, and no electrical connections to or closely adjacent to the rotating body are necessary.

Devices for translating pulses into signals, such as pressure tranducers, recording and measuring devices, and comparison charts are preferably located externally of the rotating body for ease of serviceability and in areas of safety.

BRIEF DESCRIPTION OF THE DRAWING

The single FIGURE illustrates a cross-section of a rotating body modified according to this invention, the proximity probe arrangement of this invention, and schematically, mechanism for converting generated pulses into signals indicative of surface spacing of the rotating body from the ends of the probes.

DETAILED DESCRIPTION OF THE PREFERRED EMBODIMENT

The drawing shows a section through a rotatable body 10 having a plurality of identically sized and shaped indentations 12 which are equally spaced from each other, and located in a plane normal to the theoretical axis of rotation 14 of the body 10. A pair of hollow, tubular probes 18 and 20 are positioned approximately 90° apart in the plane of the indentations. The inner ends 22 and 24 of the probes 18 and 20 are located in close proximity to the surface 26 of the body 10 and at equal and known distances from the axis 14. The probes are supported in a suitable manner, as by the walls of the body in which the shaft is rotating. The outer ends of the probes are connected to pressure tranducers 28 and 30.

As the body 10 rotates, the indentations 12 disturb the surrounding fluid medium and cause pressure pulsations. The frequency of these pulsations is determined by the number of indentations and the speed of rotation of the body 10. The amplitude of the pulsations is a function of the distance of the surface of the rotating body from the probes. They are maximum when the clearance is minimum, and vice versa.

The surface irregularities 12 produce pressure pulsations, the amplitudes of which are indicative of the spacing of the surface 26 from the inner end of the probe, and pressure pulsations so produced are fed by each hollow probe to its pressure tranducer which converts the pulsations into signals indicative of the spacing of the surface from the respective probes. By comparing these signals with calibration signals for the particular rotating body, the location of the surface from the fixed probe can be determined.

It is to be understood that the surface irregularities can be projections as well as indentations without departing from the invention, so long as the projections are equally spaced and alike in size and shape.

While the invention has been described with reference to a particular embodiment, the claims are intended to cover all reasonable equivalents.

I claim:

1. Apparatus for detecting anomalies in the spacing of a surface of a rotatable body from a stationary part when said body rotates in a fluid medium surrounding said body, comprising:
    at least a pair of probes circumferentially spaced from each other around the rotatable body, each probe being a hollow tube with at least a terminal end extending into said fluid medium and having said terminal end spaced a predetermined equal distance from the surface of said rotatable body;
    said probes being free of connection with external fluid medium sources;
    said rotatable body having a plurality of surface irregularities of like size and shape which are equally spaced from each other around the periphery thereof, said surface irregularities being located in a plane generally passing through the terminal ends of said probes;
    said surface irregularities generating pressure change pulsations in said fluid medium surrounding said body as the body rotates therein;
    said probes picking up said generated fluid medium pressure change pulsations which vary in amplitude depending upon the spacing of the surface of the rotating body and the adjacent end of a probe; and
    means to translate said pulsations into signals indicitive of the spacing of the surface of the rotating body from the probes;
    said probes transmitting said pulsations to said translating means.

2. Apparatus as recited in claim 1, wherein said surface irregularities are indentations.

3. Apparatus as recited in claim 1, wherein said surface irregularities are projections.

* * * * *